(12) United States Patent
Seo et al.

(10) Patent No.: US 8,826,363 B2
(45) Date of Patent: Sep. 2, 2014

(54) IMAGE PROCESSING APPARATUS AND METHOD

(75) Inventors: Kang-Soo Seo, Gyeonggi-Do (KR);
Byung-Jin Kim, Gyeonggi-Do (KR);
Jeong-Hwan Hwang, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 595 days.

(21) Appl. No.: 12/708,591

(22) Filed: Feb. 19, 2010

(65) Prior Publication Data
US 2010/0211984 A1 Aug. 19, 2010

(30) Foreign Application Priority Data
Feb. 19, 2009 (KR) ........................ 10-2009-0014074

(51) Int. Cl.
*H04N 7/16* (2011.01)
*H04N 21/442* (2011.01)
*H04N 21/44* (2011.01)

(52) U.S. Cl.
CPC ... *H04N 21/44004* (2013.01); *H04N 21/44209* (2013.01)
USPC ........................................................ 725/139

(58) Field of Classification Search
USPC ......................................... 725/110, 134, 139
See application file for complete search history.

(56) References Cited

U.S. PATENT DOCUMENTS

| 6,137,834 | A  | * | 10/2000 | Wine et al. ..................... 375/240 |
| 6,628,712 | B1 | * | 9/2003 | Le Maguet ............... 375/240.12 |
| 6,985,188 | B1 | * | 1/2006 | Hurst, Jr. ..................... 348/553 |
| 2006/0033846 | A1 | * | 2/2006 | Ozaki et al. ................... 348/731 |
| 2008/0024663 | A1 | | 1/2008 | Sakurada |
| 2011/0055415 | A1 | * | 3/2011 | Cuesta et al. ................ 709/231 |

* cited by examiner

*Primary Examiner* — Nathan Flynn
*Assistant Examiner* — Alfonso Castro
(74) *Attorney, Agent, or Firm* — Fish & Richardson P.C.

(57) ABSTRACT

The image processing apparatus includes an image receiver configured to receive video. The apparatus also include a first channel buffer configured to store first bit rate video data and a second channel buffer configured to y store video data when a network transmission speed corresponds to a preset condition. The apparatus further includes a decoder configured to receive and decode the video data stored in the first or second channel buffer. In addition, the apparatus includes a controller configured to transmit the video data stored in the first channel buffer to the decoder while the data is stored in the second channel buffer, and configured to transmit the video data stored in the second channel buffer to the decoder when a predetermined amount of video data is stored in the second channel buffer.

15 Claims, 3 Drawing Sheets

IMAGE PROCESSING APPARATUS AND METHOD

CROSS-REFERENCE TO A RELATED APPLICATION

The present application claims the benefit of priority to Korean Application No. 10-2009-0014074, filed on Feb. 19, 2009, which is herein expressly incorporated by reference in its entirety.

FIELD

The present disclosure relates to an image processing apparatus and a moving image processing method thereof.

BACKGROUND

A streaming service indicates a service having video (e.g., moving picture, moving image, etc.) data downloaded from a server into an image display apparatus via a network and simultaneously reproduced to output the moving picture.

Video data transmitted via a network has a specific file format specification. For a streaming service via an internet protocol (IP) network, video data is generated and transmitted according to a moving picture expert group (MPEG) standardization established by the MPEG, which is a moving picture research group under the International Organization for standardization (ISO/IEC).

Examples of image display apparatuses, each of which receives such video data from a server through a streaming service on a network and reproduces the same, include stationary terminals, such as desktop computers, IP TVs and the like, and mobile terminals, such as mobile communication terminals, navigation apparatuses, telematics terminals, portable multimedia players (PMPs), laptop computers and the like.

When reproducing a moving image by using a streaming service, a network transmission speed may be varied based on many factors. Accordingly, streaming a moving image is not efficient when a network transmission speed changes.

SUMMARY

In one aspect, an image processing apparatus includes an image receiver configured to receive video data through a network. The apparatus also includes a first channel buffer configured to store at least a portion of the received video data and a processing mechanism configured to determine a network transmission speed based on the received video data. The apparatus further includes a second channel buffer configured to store at least a portion of the received video data responsive to a determination by the processing mechanism that the network transmission speed is a preset condition and a decoder configured to receive and decode the video data stored in the first or second channel buffer. In addition, the apparatus includes a controller configured to control the image receiver to receive the video data, configured to transmit the video data stored in the first channel buffer to the decoder while the data is being stored in the second channel buffer, and configured to transmit the video data stored in the second channel buffer to the decoder when a predetermined amount of video data has been stored in the second channel buffer.

Implementations maybe include one or more of the following features. For example, the first buffer is configured to store at least a portion of the received video data at a first bit rate and the second buffer is configured to store at least a portion of the received video data at a second bit rate. The first channel buffer and the second channel buffer are configured to temporarily store the same video data at different bit rates. The image receiver includes an external signal receiving module. The first bit rate is higher the second bit rate.

The second channel buffer is configured to store the received video data responsive to a determination by the processing mechanism that the determined network transmission speed is lower than a predetermined rate. The predetermined rate includes a rate to maintain a picture quality of the video data. The second channel buffer is configured to store the received video data responsive to a determination by the processing mechanism that the determined network transmission speed is lower than or equal to the first bit rate. The first bit rate is lower than the second bit rate.

In some examples, the second channel buffer is configured to store the received video data responsive to a determination by the processing mechanism that the determined network transmission speed is higher than or equal to the second bit rate. The controller is configured to transmit, to the decoder, video data subsequent to the video data stored in the first channel buffer, among the video data stored in the second channel buffer.

The controller is configured to detect information relating to a reproduction time of the video data transmitted to the decoder from the first channel buffer, and access video data stored in the second buffer based on the detected information. The apparatus further includes a display unit configured to display the decoded video data.

In another aspect, an image processing method of an image processing apparatus includes receiving video data and storing the video data in a first channel buffer at a first bit rate and determining a network transmission speed based on the received video data. The method also includes storing the video data in a second channel buffer at a second bit rate when the determined network transmission speed corresponds to a preset condition. The method further includes reproducing a moving image based on the video data stored in the first channel buffer while the data is stored in the second channel buffer. In addition, the method includes reproducing a moving image based on the video data stored in the second channel buffer when a predetermined amount of video data is stored in the second channel buffer.

Implementations maybe include one or more of the following features. For example, the first bit rate video data and the second bit rate video data are obtained by encoding the same moving image. Reproducing the moving image based on the video data temporarily stored in the second channel buffer includes detecting information relating to a reproduction time of the video data transmitted to a decoder from the first channel buffer and extracting a corresponding video data stored in the second channel buffer based on the detected information. Storing the video data in the second channel buffer when the determined network transmission speed is lower than a predetermined rate. Storing the video data in the second channel buffer when the determined network transmission speed is lower than or equal to the first bit rate. Storing the video data in the second channel buffer when the determined network transmission speed is higher than or equal to the second bit rate. Determining the network transmission speed is based on detection of at least one of a format and a bit rate of the received video data.

DETAILED DESCRIPTION

An image display apparatus according to the present disclosure may be applied to stationary terminals such as digital TVs and desktop computers, and mobile terminals such as mobile communication terminals, smart phones, laptop computers, digital broadcast terminals, portable multimedia players (PMPs), and navigation apparatuses. The mobile terminals may be implemented to be carried by a user, and to receive and transmit signals.

Figure 1:
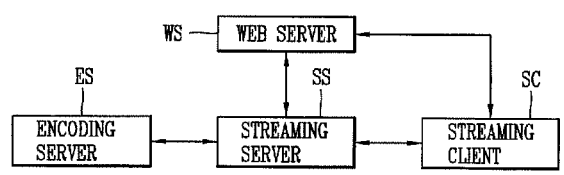
FIG. 1 is a block diagram of a streaming service system.

Referring to FIG. 1, a streaming service system includes a web server WS, a streaming server SS, a streaming client SC, and an encoding server ES, which receives real-time video information from a contents provider CP.

For example, the encoding server ES converts video information received in real time into video data in a video format used for a streaming service. The encoding server ES then transmits the video data to the streaming server SS.

When the streaming client SC requests streaming data, the streaming server SS transmits the data to the streaming client SC. The streaming server SS can also read a header of the stored video data to determine a format, bit rate and the like of the video data to be transmitted, and determine a proper data transmission speed based upon the determined format, bit rate and the like.

Further, the streaming server SS can transmit statistical information (e.g., a time stamp, the number of cumulative packets, etc.) of the network to the streaming client SC, and also receive statistical information (e.g., the number of cumulative packets lost, packet jitter, etc.) from the streaming client SC.

The streaming server SS also detects transmission environments of the network based upon the statistical information. Further, the network transmission environments may include information about a transmission status of video data between the streaming server SS and the streaming client SC, available bandwidth information upon transmission and information relating to a network transmission speed, etc.

The streaming server SS can also receive video data in real time from the encoding server ES or another server, and transmit the received video data to the streaming client SC. In addition, the streaming client SC can access the streaming server SS via the web server WS or directly access the streaming server SS to request video data. The streaming client SC includes an image processing apparatus 100 for processing received video data. The streaming client SC and the web server WS can be also connected to each other via an Internet network.

As shown in FIG. 1, the web server WS is connected to the streaming server SS, and thus the streaming client SC can receive a list of video data provided by the streaming service via the web server WS. The streaming client SC can also transmit a request signal to the streaming server SS via the web server WS to request video data. The streaming client SC can also receive the streaming service using a web page provided via the web server WS.

Further, the web server WS can provide a list of video data which can be provided to the streaming client SC through the streaming service. The web server WS can command the streaming server SS to transmit video data to the streaming client SC in response to the video data request from the streaming client SC.

Figure 2:
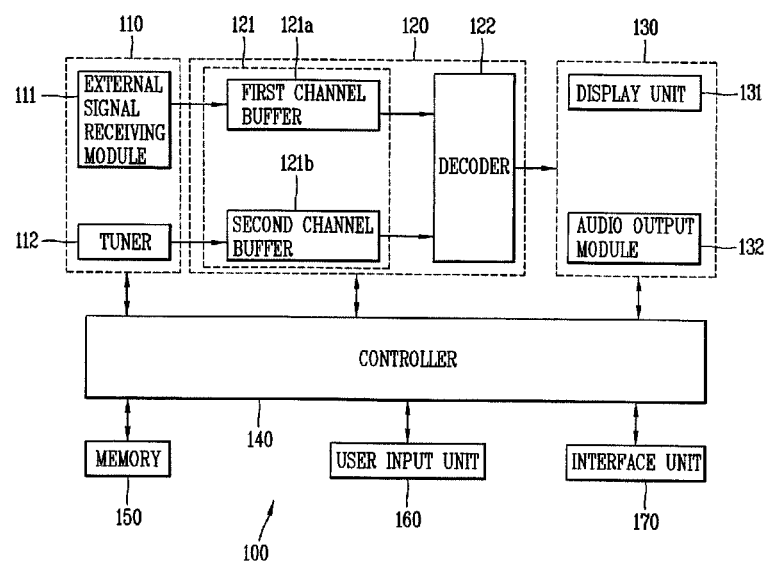
FIG. 2 is a block diagram of an image display apparatus.

Referring to FIG. 2, the image display apparatus 100 includes an image receiver 110, an image processor 120, an image output unit 130, a controller 140, a memory 150, a user input unit 160, and an interface unit 170. However, all of the illustrated components are not a requirement, and greater or fewer components may alternatively be implemented.

In this implementation, the image receiver 110 can receive an external image signal and/or information associated with the image signal, and transmit the received image signal and/or the information to the image processor 120. In FIG. 2, the image receiver 110 includes an external signal receiving module 111 and a tuner 112.

The external signal receiving module 111 can receive external signals input via external devices such as digital versatile disks (DVDs), set top boxes, camcorders and/or networks such as wired/wireless Internet network and the like.

Examples of such wireless Internet networks include Wireless LAN (WLAN) (Wi-Fi), Wireless Broadband (Wibro), Worldwide Interoperability for Microwave Access (Wimax), High Speed Downlink Packet Access (HSDPA) and the like.

Examples of wired Internet networks include Ethernet, the hybrid fiber coax (HFC) network, the asymmetric digital subscriber line (ADSL) network, the very high-data rate digital subscriber line (VDSL) network, the fiber-to-the-home (FTTH) network, the power line communication (PLC) network and the like.

In addition, the external device and the image display apparatus 100 can be connected to each other by wire or wirelessly through the external signal receiving module 111.

The external device and the image display apparatus 100 can also be connected wirelessly using a short-range communication technology such as BLUETOOTH, Radio Frequency Identification (RFID), Infrared Data Association (IrDA), Ultra-WideBand (UWB), ZigBee, etc.

Further, the tuner 112 can receive a broadcast signal and/or broadcast associated information from an external broadcast managing entity via a broadcast channel. The broadcast channel may include a satellite channel and a terrestrial channel, and the broadcast managing entity may indicate a server which generates and transmits a broadcast signal and/or broadcast associated information or a server which receives a pre-generated broadcast signal and/or broadcast associated information and sends them to the portable terminal. The broadcast signal may be implemented as a TV broadcast signal, a radio broadcast signal, and a data broadcast signal, among others. Also, the broadcast signal may further include a data broadcast signal combined with the TV or radio broadcast signal.

Examples of broadcast associated information may include information associated with a broadcast channel, a broadcast program, a broadcast service provider, and the like. The broadcast associated information can also be provided via a mobile communication network, and also be implemented in various formats. For instance, the broadcast associated information may include an Electronic Program Guide (EPG) of the Digital Multimedia Broadcasting (DMB) system, an Electronic Service Guide (ESG) of the Digital Video Broadcast-Handheld (DVB-H) system, and the like.

The tuner 112 can also be configured to receive digital broadcast signals transmitted from various types of broadcast systems. Such digital broadcast systems may include the Digital Multimedia Broadcasting-Terrestrial (DMB-T) system, the Digital Multimedia Broadcasting-Satellite (DMB-S) system, the Media Forward Link Only (MediaFLO) system, Digital Video Broadcast-Handheld (DVB-H), Integrated Services Digital Broadcast-Terrestrial (ISDB-T) system, etc.

The tuner 112 can also be configured to be suitable for other broadcast systems as well as the digital broadcast systems.

In addition, the image signal and/or image associated information received by the image receiver 110 can be stored in the memory 150.

The image processor 120 can receive an image signal from the image receiver 110 and process the received image signal. In FIG. 1, the image processor 120 includes a channel buffer 121 and a decoder 122. The channel buffer 121 may include a first channel buffer 121a and a second channel buffer 121b. The first and second channel buffers 121a and 121b may be implemented as separate memories by hardware, or implemented as regions partitioned from each other in one memory.

In this implementation, the channel buffer 121 can receive an image signal from the image receiver 110 and temporarily store the received image signal. The image signal may be stored as a data stream format that is combination of video data for video reproduction and audio data for audio reproduction.

The data stored in the channel buffer 121 can be deleted after being transmitted to the decoder 122. Alternatively, the data stored in the channel buffer 121 can be stored for a preset time after being transmitted to the decoder 122. For example, the decoder 122 converts the video or audio data into a format to be useable by the controller 140 or the image output unit 130.

The video and/or audio data can also be in a variety of formats such as a format of audio video interleaved (AVI), MPEG, DivX, XviD, windows media video codec (WMV) or the like.

The image output unit 130 also displays image (video) and/or reproduces sound (audio) using the data converted by the decoder 122. In FIG. 2, the image output unit 130 includes a display unit 131 and an audio output module 132.

For example, the display unit 131 can output information processed in the image processing processor 120. When the image display apparatus 100 is operating in a video output mode, the display unit 131 outputs videos (e.g., moving picture, motion picture, moving image, etc.). Also, when the image display apparatus 100 is in an Internet communication mode, the display unit 131 displays a user interface (UI) or a graphic user interface (GUI) which includes information associated with the Internet communication.

Further, the display unit 131 may be implemented using, for example, a Liquid Crystal Display (LCD), a Thin Film Transistor-Liquid Crystal Display (TFT-LCD), an Organic Light-Emitting Diode (OLED), a flexible display, a Field Emission Display (FED), a three-dimensional (3D) display, a plasma display panel (PDP), a multi display tube (MDT), a transparent display, etc. In addition, the audio output module 132 can output audio or sound data decoded by the decoder 122, and may be implemented, for example, using a dynamic speaker, an electrostatic speaker, a planar-magnetic speaker and the like.

Also, the controller 140 controls the overall operations of the image display apparatus 100. For example, the controller 140 processes data received via the image receiver 110 or data stored in the memory 150. The controller 140 may also include a digital signal processor (DSP).

For example, the memory 150 stores a program for process and control of the image display apparatus and/or input/output data. The memory 150 may be implemented using any type of suitable storage medium including a flash memory type, a hard disk type, a multimedia card micro type, a memory card type (e.g., SD or XD memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. In addition, the image display apparatus 100 may be operated as a web storage on the Internet.

Further, the user input unit 160 can receive a signal to control the operation of the image display apparatus 100. The signal may indicate a signal to control the operation (Rewind, Fast-Forward, Pause, Record, etc.) of a moving image being currently. Alternatively, the signal may indicate a signal to control the operation of the image display apparatus 100 such as power ON/OFF, reservation recording, Internet communication module Enable/Disable, short range wireless communication module Enable/Disable, broadcast channel change function, volume control function, mute function, etc. Audio data or video data may also be directly input to the user input unit 160 by a user through a camera or a microphone in addition to the signal to control the operation of the image display apparatus 100. Also, the signals can be input directly by a user or indirectly input using a wired/wireless remote controller.

In addition, the interface unit 170 is implemented to interface the image display apparatus 100 with external devices. The interface unit 170 can also allow a data reception from an external device, a power delivery to each component in the image display apparatus 100, or a data transmission from the image display apparatus 100 to an external device. For example, the interface unit 170 may include wired/wireless headset ports, external charger ports, wired/wireless data ports, memory card ports, ports for coupling devices having an identification module, audio Input/Output (I/O) ports, video I/O ports, earphone ports, and the like.

Also, for a hardware implementation, the components described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some instances, such components are implemented by the controller 140.

For a software implementation, the operations such as procedures and functions may be implemented together with separate software modules each of which performs at least one of functions and operations. The software codes can be implemented with a software application written in any suitable programming language. Also, the software codes may be stored in the memory 150 and executed by the controller 140.

The image receiver 110 may receive video data having different bit rates. The image receiver 110 may receive first bit rate video data, or second bit rate video data under control of the controller 140. For example, the first and second bit rate video data may be obtained by encoding the same moving image at different bit rates. The first and second bit rate video data may be obtained by encoding the same moving image to video data having a relatively high picture quality and video data having a relatively low picture quality. The image display apparatus 100 may select one of the first bit rate video data and the second bit rate video data based on changes of a network transmission speed.

A first channel buffer 121a may temporarily store first bit rate video data. When the image receiver 110 receives the first bit rate video data, the first bit rate video data is stored in the first channel buffer 121a. The first channel buffer 121a may transmit the video data stored therein to the decoder 122 under control of the controller 140. Then, the video data transmitted to the decoder 122 is deleted from the first channel buffer 121a, thereby allowing the first channel buffer 121a to have a space for storing new video data.

A second channel buffer 121b may temporarily store second bit rate video data. The second channel buffer 121b may operate in a similar manner as the first channel buffer 121a.

As shown in FIG. 2, the decoder 122 may receive the video data stored in the first channel buffer 121a or the second channel buffer 121b, and decode the received video data. The decoder 122 may determine whether the received data is from the first channel buffer 121a or from the second channel buffer. The decoder 122 may operate independently from the image receiver 110. For instance, when the image receiver 110 receives the first bit rate video data, the decoder 122 may decode the first bit rate video data, or the second bit rate video data differently from the image receiver 110, and vice versa.

As show in FIG. 2, the external signal receiving module 111 of the image receiver 110 may detect a network transmission speed. The external signal receiving module 111 may determine or predict the network transmission speed by receiving a signal relating to the network transmission speed. Alternatively, the controller 140 may estimate the network transmission speed by calculating the amount of video data received for a preset time period, and thus by calculating the amount of video data received per unitary time.

Further, the controller 140 may determine whether a network transmission speed corresponds to a preset condition while receiving the first bit rate video data. When the network transmission speed corresponds to the preset condition, the controller 140 may control the image receiver 110 to receive the second bit rate video data.

The first bit rate may have a value higher than that of the second bit rate. For instance, the first bit rate video data may have a picture quality higher than that of the second bit rate video data. In this case, the preset condition may be satisfied when the detected network transmission speed is lower than or equal to the first bit rate. The preset condition may be utilized when a picture quality of video data being currently processed can not be maintained as the network transmission speed becomes low.

It is assumed that the network transmission speed is 2 Mbps (Mega bits per second), the first bit rate is 1.5 Mbps, and the second bit rate is 0.5 Mbps. In the case that the network transmission speed is maintained as 2 Mbps, the image display apparatus 100 has no difficulty in streaming the first bit rate video data for reproduction.

It is assumed that the network transmission speed is lowered to 1 Mbps. In the case that the image display apparatus 100 is to stream the first bit rate video data for reproduction, a size (1.5 Mbits) of video data flowing to the decoder 122 from the channel buffer 121 for reproduction is larger than a size (1 Mbits) of video data flowing to the channel buffer 121 from the network. If this phenomenon is maintained for a long time, the video data remaining in the channel buffer 121 is exhausted up. This may cause video data to be decoded not to exist in the channel buffer 121 any longer, which is called as an 'underflow' phenomenon of the channel buffer 121.

When the underflow phenomenon of the channel buffer 121 occurs, video data being streamed for reproduction may be stopped. In this case, the image display apparatus 100 may prevent the underflow phenomenon of the channel buffer 121 by receiving the second bit rate video data. Accordingly, when the network transmission speed becomes lower than the first bit rate, the controller 140 may control the image receiver 110 to receive video data having the second bit rate lower than the first bit rate.

The first bit rate may be lower than or equal to the second bit rate. For instance, the first bit rate video data may have a picture quality lower than that of the second bit rate video data. In this case, the preset condition may be satisfied when the detected network transmission speed is higher than or equal to the second bit rate. The preset condition may be utilized to stream video data having a picture quality higher than that of video data being currently reproduced as the network transmission speed is enhanced.

It is assumed that the network transmission speed is 1 Mbps (Mega bits per second), the first bit rate is 0.5 Mbps, and the second bit rate is 1.5 Mbps. In the case that the network transmission speed is maintained as 1 Mbps, the image display apparatus 100 may stream the first bit rate video data for reproduction. However, when the second bit rate video data is streamed, the underflow phenomenon of the channel buffer 121 may occur.

It is assumed that the network transmission speed is increased to 2 Mbps. In this case, the image display apparatus 100 may stream the second bit rate video data. And, the image display apparatus 100 may provide, to a user, video data having a picture quality higher than that of video data being currently reproduced. Accordingly, when the network transmission speed becomes higher than the second bit rate, the controller 140 may control the image receiver 110 to receive video data having the second bit rate higher than the first bit rate.

When the second bit rate video data is received as the preset condition, the second bit rate video data may be stored in the second channel buffer 121b. However, even if the second bit rate video data is received by the image receiver 110, the second bit rate video data may not be immediately decoded for reproduction. For instance, in order for the image display apparatus 100 to display a moving image, video data having a size more than a predetermined size has to be stored in the channel buffer 121. In this case, the controller 140 may control the video data remaining in the first channel buffer 121a to be transmitted to the decoder 122 while the image receiver 110 receives video data having a size more than a predetermined size and stores the received video data in the second channel buffer 121b.

Under these configurations, even when the image display apparatus 100 stores video data having a size more than a predetermined size for reproduction (e.g., a 'retrieving' operation), discontinuity of video data being reproduced may be prevented by the video data stored in the first channel buffer 121a.

The controller 140 may control to transmit, to the decoder 122, video data subsequent to the video data temporarily stored in the first channel buffer 121a, among the video data temporarily stored in the second channel buffer 121b. The controller 140 may detect information relating to a reproduction time of the video data transmitted to the decoder 122 from the first channel buffer 121a. Alternatively, the controller 140 may control to extract video data temporarily stored in the second channel buffer 121b, the video data having a reproduction time subsequent to the detected reproduction time, and then transmit the extracted video data to the decoder 122.

Figure 3:
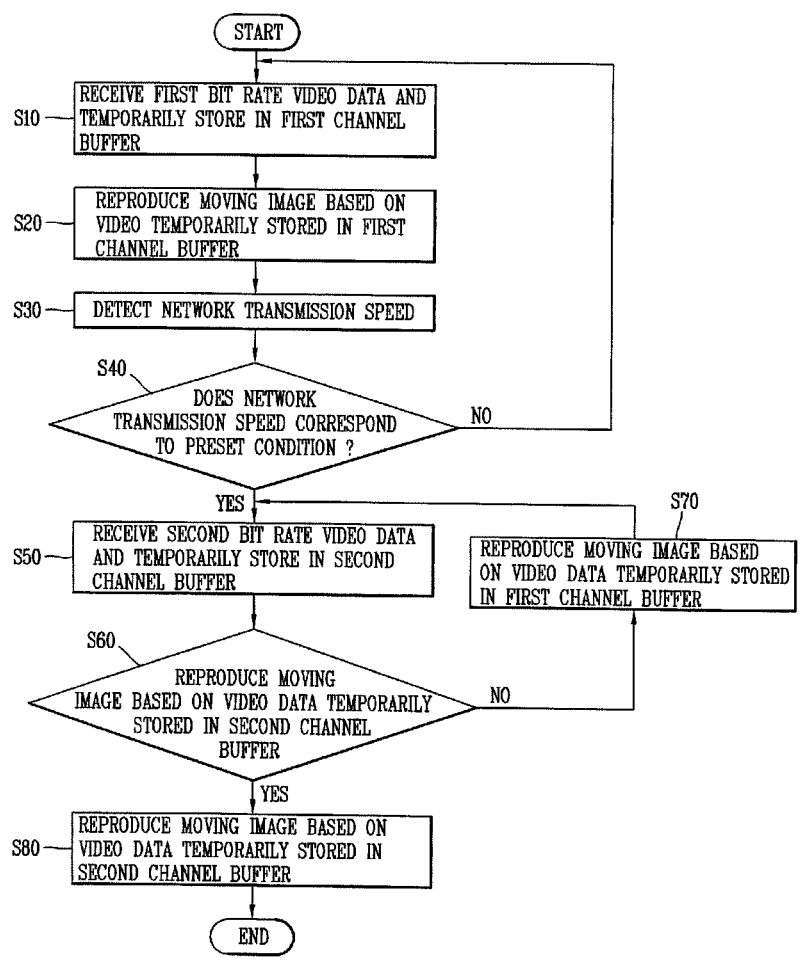
FIG. 3 is a flowchart showing a moving image streaming process of an image display apparatus.

FIG. 3 is a flowchart showing a moving image streaming method of the image display apparatus according to one embodiment of the present invention.

As shown in FIG. 3, the image display apparatus 100 may receive first bit rate video data, and temporarily store the received video data in the first channel buffer 121a (S10).

Then, the image display apparatus 100 may reproduce a moving image based on the video data temporarily stored in the first channel buffer 121a (S20).

Then, the image display apparatus 100 may detect a network transmission speed (S30), and determine whether the detected network transmission speed corresponds to a preset condition (S40).

When the network transmission speed does not correspond to the preset condition, the image display apparatus may repeatedly perform the steps S10~S30. On the other hand, when the network transmission speed corresponds to the preset condition, the image display apparatus 100 may receive second bit rate video data to temporarily store the received video data in the second channel buffer 121b (S50).

The image display apparatus 100 may determine whether a predetermined amount of video data has been stored in the second channel buffer 121b (S60).

When less amount of video data less than the predetermined amount of video data has been stored in the second channel buffer 121b, the image display apparatus 100 may reproduce a moving image based on the video data temporarily stored in the first channel buffer 121a (S70).

On the other hand, when as same as or more than the predetermined amount of video data has been stored in the second channel buffer 121b, the image display apparatus 100 may reproduce a moving image based on the video data temporarily stored in the second channel buffer 121b (S80).

Figures 4A, 4B, 4C:
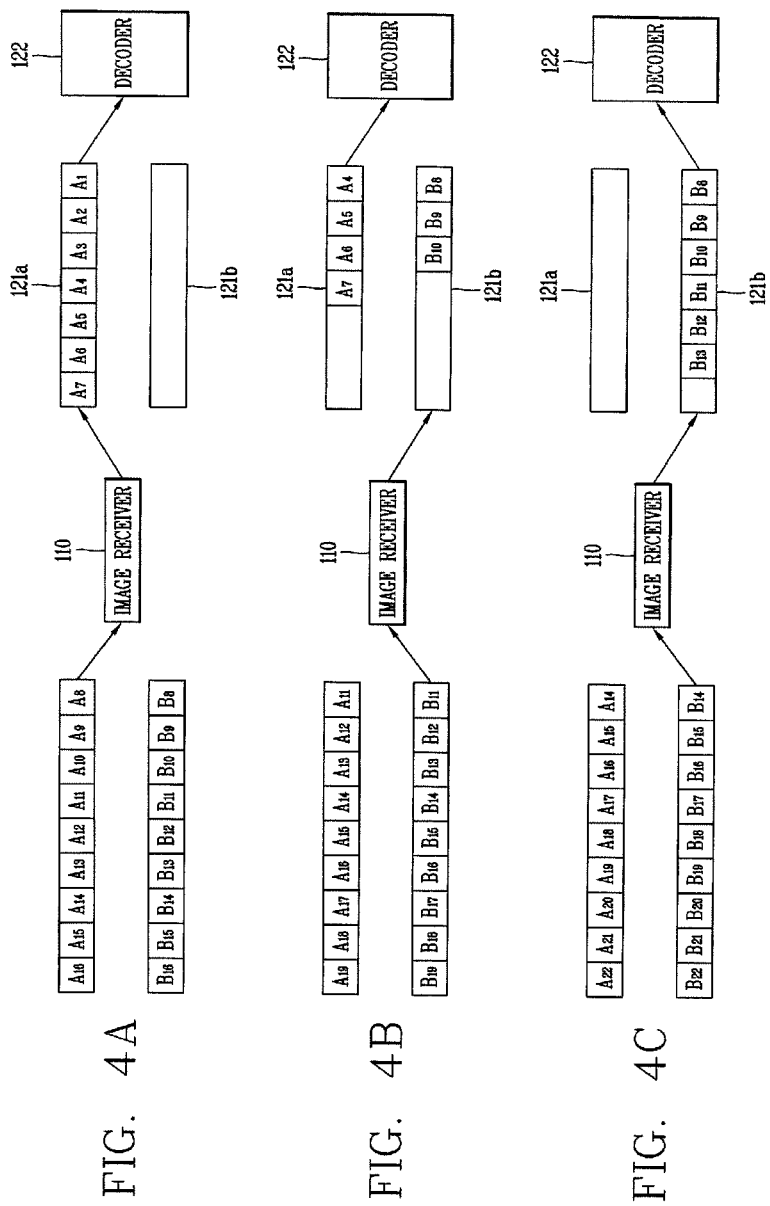
FIGS. 4A to 4C are block diagrams showing a moving image streaming process of an image display apparatus.

Referring to FIGS. 4A to 4C, the first channel buffer 121a and the second channel buffer 121b are separately shown from each other. However, the first channel buffer 121a and the second channel buffer 121b may be implemented as separate regions partitioned from each other in the same channel buffer 121.

As shown in FIG. 4A, the image receiver 110 may receive first bit rate video data A1~A6 to store the received video data A1~A6 in the first channel buffer 121a. And, the decoder 122 may receive the video data from the first channel buffer 121a to decode the received video data.

As shown in FIG. 4B, when the network transmission speed corresponds to the preset condition, the controller 140 may control the image receiver 110 to receive second bit rate video data B8~B16. In this case, the image receiver 110 may temporarily store the received video data in the second channel buffer 121b. Alternatively, the controller 140 may control video data A4~A7 remaining in the first channel buffer 121a to be transmitted to the decoder 122 until video data having a size more than a predetermined size is stored in the second channel buffer 121b.

As shown in FIG. 4C, when the predetermined amount of video data is stored in the second channel buffer 121b, the controller 140 may control video data B8~B13 remaining in the second channel buffer 121b to be transmitted to the decoder 122. In this case, the controller 140 may control video data subsequent to the video data decoded by the decoder 122 to be extracted from the video data B8~B13 remaining in the second channel buffer 121b, and to be transmitted to the decoder 122. For instance, when video data lastly transmitted to the decoder 122 is A7, the controller 140 may extract the video data B8 subsequent to the A7, from the video data B8~B13 stored in the second channel buffer 121b, and then transmit the extracted video data B8 to the decoder 122.

Under these configurations, even if the network transmission speed is changed, a user may sense instantaneous conversion of a picture quality without causing discontinuity of a moving image being streamed.

The aforementioned method may be implemented as a program code stored in a computer-readable storage medium. The storage medium may include ROM, RAM, CD-ROM, a magnetic tape, a floppy disc, an optical data storage device, etc. And, the storage medium may be implemented as carrier wave (transmission through the Internet).

The image display apparatus includes an image receiver configured to receive video data having different bit rates. The image display apparatus also includes a first channel buffer configured to temporarily store first bit rate video data and a second channel buffer configured to temporarily store second bit rate video data. The image display apparatus further includes a decoder configured to receive and decode the video data stored in the first or second channel buffer. In addition, the image display apparatus includes a controller configured to control the image receiver to receive the second bit rate video data when a network transmission speed corresponds to a preset condition while the first bit rate video data is received, configured to transmit the video data stored in the first channel buffer to the decoder while the data is stored in the second channel buffer, and configured to transmit the video data stored in the second channel buffer to the decoder when the video data having a predetermined size has been completely stored in the second channel buffer.

The first and second bit rate video data may be obtained by encoding the same moving image at different bit rates. The image receiver may include an external signal receiving module configured to detect the network transmission speed. The first bit rate may have a value higher than that of the second bit rate. In this case, the preset condition may be satisfied when the detected network transmission speed is lower than or equal to the first bit rate. The first bit rate may have a value lower than that of the second bit rate. In this case, the preset condition may be satisfied when the detected network transmission speed is higher than or equal to the second bit rate.

The controller may transmit, to the decoder, video data subsequent to the video data temporarily stored in the first channel buffer, among the video data temporarily stored in the second channel buffer. The controller may detect information relating to a reproduction time of the video data transmitted to the decoder from the first channel buffer. Alternatively, the controller may extract, from the video data temporarily stored in the second channel buffer, video data having a reproduction time subsequent to the detected reproduction time, and then transmit the extracted video data to the decoder.

The moving image processing method of an image display apparatus includes: receiving video data and temporarily storing the video data in a first channel buffer. The method also includes storing the video data in a second channel buffer when a network transmission speed corresponds to a preset condition. The method further includes reproducing a moving image based on the video data temporarily stored in the first channel buffer while the data is stored in the second channel buffer. In addition, the method includes reproducing a moving image based on the video data temporarily stored in the second channel buffer when the video data having a predetermined size has been completely stored in the second channel buffer.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. An image processing apparatus, comprising:
   an image receiver configured to receive video data through a network;
   a first channel buffer configured to store at least a portion of the received video data;
   a processing mechanism configured to determine a network transmission speed based on the received video data;
   a second channel buffer configured to store at least a portion of the received video data responsive to a determination by the processing mechanism that the network transmission speed corresponds to a preset condition;
   a decoder configured to receive and decode the video data stored in the first or second channel buffer; and
   a controller configured to control the image receiver to receive the video data, configured to transmit the video data stored in the first channel buffer to the decoder while the data is being stored in the second channel buffer, configured to identify an amount of video data stored in the second channel buffer, and configured to determine whether the identified amount of video data stored in the second channel buffer has reached a predetermined amount of video data,
   wherein the first channel buffer and the second channel buffer are configured to temporarily store the same video data at different bit rates,
   wherein the first buffer is configured to store at least a portion of the received video data at a first bit rate and the second buffer is configured to store at least a portion of the received video data at a second bit rate,
   wherein the first bit rate is higher than the second bit rate based on the preset condition being a first preset condition, and the first bit rate is lower than the second bit rate based on the preset condition being a second preset condition,
   wherein the first preset condition is satisfied based on the detected network transmission speed being lower than or equal to a first threshold, and the second preset condition is satisfied based on the detected network transmission speed being higher than or equal to a second threshold that is higher than or equal to the first threshold, and
   wherein when the predetermined is stored in the second channel buffer and the second preset condition is satisfied, the controller is configured to extract, from the video data of the video stored in the second channel buffer, second video data that is subsequent to first video data of the video that was previously transmitted to the decoder from the first channel buffer and configured to transmit, to the decoder, the extracted second video data.

2. The image processing apparatus of claim 1, wherein the image receiver comprises an external signal receiving module.

3. The image processing apparatus of claim 1, wherein the second channel buffer is configured to store the received video data responsive to a determination by the processing mechanism that the determined network transmission speed is lower than a predetermined rate.

4. The image processing apparatus of claim 3, wherein the predetermined rate includes a rate to maintain a picture quality of the video data.

5. The image processing apparatus of claim 1, wherein the second channel buffer is configured to store the received video data responsive to a determination by the processing mechanism that the determined network transmission speed is lower than or equal to the first threshold.

6. The image processing apparatus of claim 1, wherein the second channel buffer is configured to store the received video data responsive to a determination by the processing mechanism that the determined network transmission speed is higher than or equal to the second threshold.

7. The image processing apparatus of claim 1, wherein the controller is configured to detect information relating to a reproduction time of the video data transmitted to the decoder from the first channel buffer, and access video data stored in the second buffer based on the detected information.

8. The image processing apparatus of claim 1, further comprising:
   a display unit configured to display the decoded video data.

9. The image processing apparatus of claim 1, wherein the controller is further configured to transmit, to the decoder, video data stored in the second channel buffer responsive to a determination that both the network transmission speed satisfies the second preset condition as determined by the processing mechanism and an amount of video data satisfying a predetermined amount has been stored in the second channel buffer.

10. An image processing method of an image processing apparatus, comprising:
    receiving video data and storing the video data in a first channel buffer at a first bit rate;
    determining a network transmission speed based on the received video data;
    storing the video data in a second channel buffer at a second bit rate when the determined network transmission speed corresponds to a preset condition;
    reproducing a moving image based on the video data stored in the first channel buffer while the data is stored in the second channel buffer; and
    reproducing a moving image based on the video data stored in the second channel buffer,
    wherein the first channel buffer and the second channel buffer are configured to temporarily store the same video data at different bit rates,
    wherein the first buffer is configured to store at least a portion of the received video data at a first bit rate and the second buffer is configured to store at least a portion of the received video data at a second bit rate,
    wherein the first bit rate is higher than the second bit rate based on the preset condition being a first preset condition, and the first bit rate is lower than the second bit rate based on the preset condition being a second preset condition,
    wherein the first preset condition is satisfied based on the detected network transmission speed being lower than or equal to a first threshold, and the second preset condition is satisfied based on the detected network transmission speed being higher than or equal to a second threshold that is higher than or equal to the first threshold, and
    wherein, when the predetermined amount of video data is stored in the second channel buffer and the second preset condition is satisfied, the controller is configured to extract from, the video data of the video stored in the second channel buffer, second video data subsequent to first video data of the video that was previously transmitted to the decoder from the first channel buffer, and configured to transmit, to the decoder, the extracted second video data.

11. The method of claim 10, wherein the first bit rate video data and the second bit rate video data are obtained by encoding the same moving image.

12. The method of claim 10, further comprising:
- detecting information relating to a reproduction time of the video data transmitted to a decoder from the first channel buffer; and
- extracting a corresponding video data stored in the second channel buffer based on the detected information.

13. The method of claim 10, wherein storing the video data in the second channel buffer occurs based on the determined network transmission speed being higher than or equal to the second threshold.

14. The method of claim 10, wherein determining the network transmission speed is based on detection of at least one of a format and a bit rate of the received video data.

15. The method of claim 10, wherein the first bit rate video data and the second bit rate video data are both digital video data.

* * * * *